United States Patent Office 2,709,806
Patented May 31, 1955

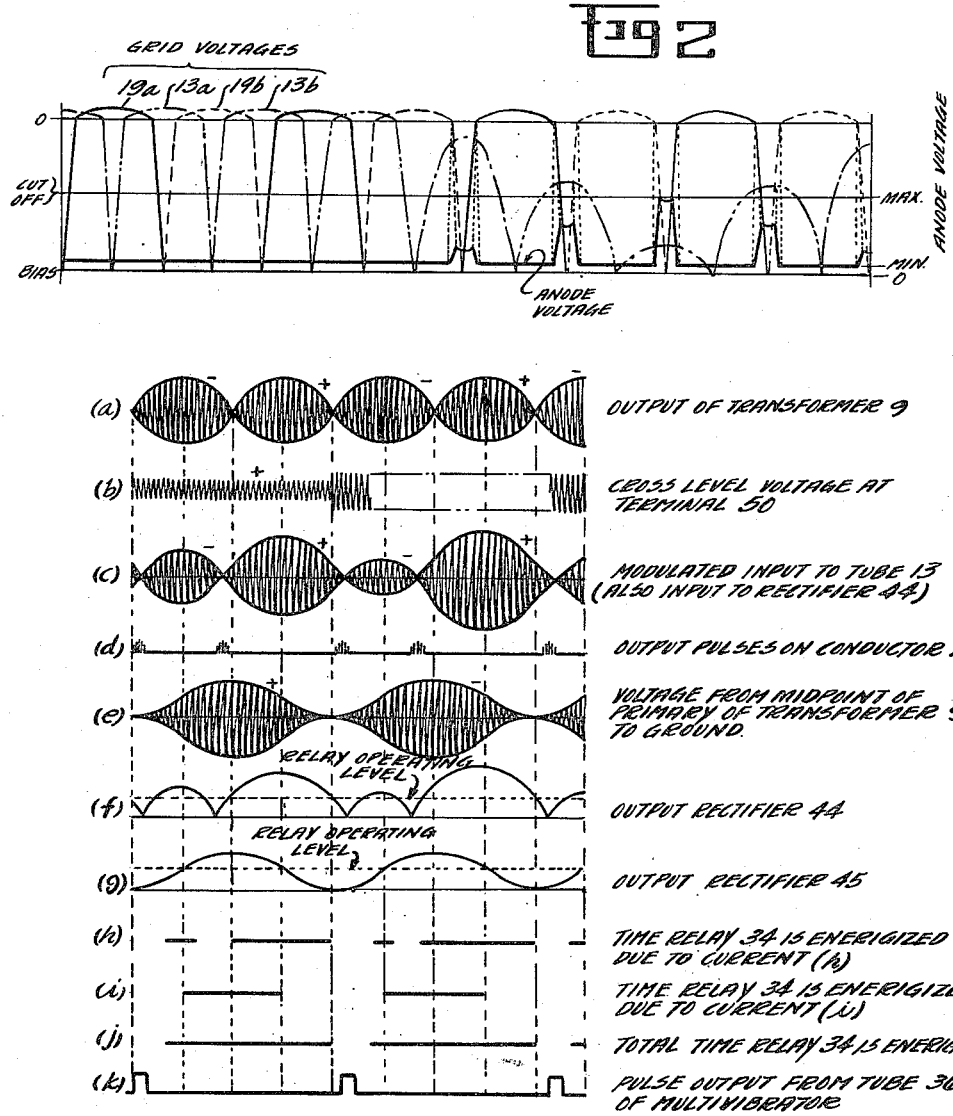

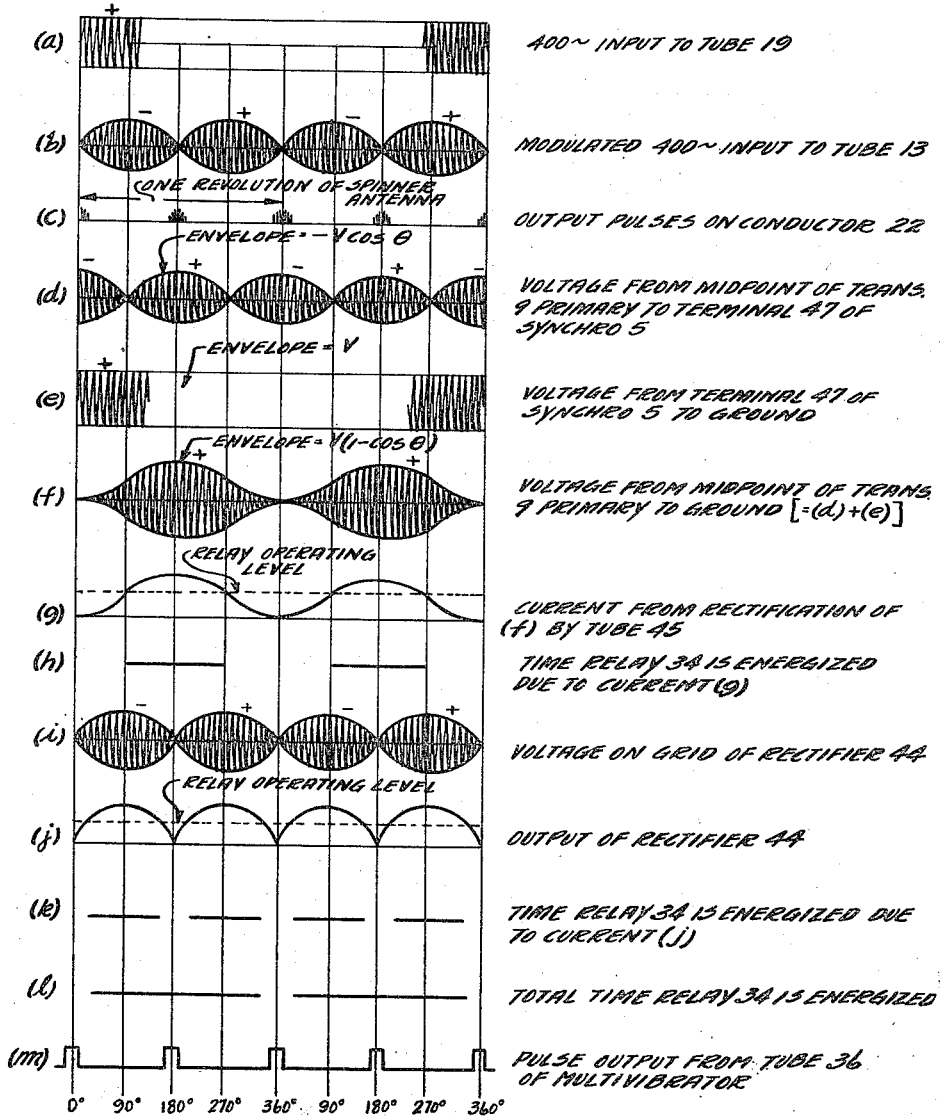

2,709,806

AZIMUTH MARK GENERATOR

Keith Boyer, Los Alamos, N. Mex., assignor, by mesne assignments, to the United States of America as represented by the Secretary of the Air Force Application March 24, 1952, Serial No. 278,258

6 Claims. (Cl. 343—16)

This invention relates to airborne radar navigational systems and in particular to the cathode-ray tube indicator circuits used in such systems.

It is the object of the invention to provide a circuit for producing an unblanking pulse for turning on the beam of a cathode-ray tube indicator of the P. P. I. type for the period of two or three sweeps in order to generate an azimuth line on the screen of the tube.

The circuit is designed for use with an airborne computer capable of continuously determining the heading of the airplane, the azimuth of the scanning radio beam relative to the airplane and the direction to a fix or else to an aim point having a known offset relative to the fix. The circuit operates to produce the above mentioned unblanking pulse when the azimuth of the direction to the fix or aim point becomes equal to the heading of the airplane plus the azimuth of the scanning radio beam. The circuit also contains provisions for the application of a cross-level error voltage to compensate for the effects of pitch and roll of the airplane on the time of azimuth mark generation.

A more detailed discussion of a specific embodiment of the invention will be given in connection with the accompanying drawings in which Fig. 1 is a schematic circuit diagram of the azimuth mark generator;

Fig. 2 is a graph illustrating the operation of tubes 13 and 19 of Fig. 1;

Fig. 3 shows a series of graphs illustrating the operation of the azimuth mark generator circuit; and Fig. 4 illustrates the operation of the circuit in the presence of a cross level error signal.

Figure 1:
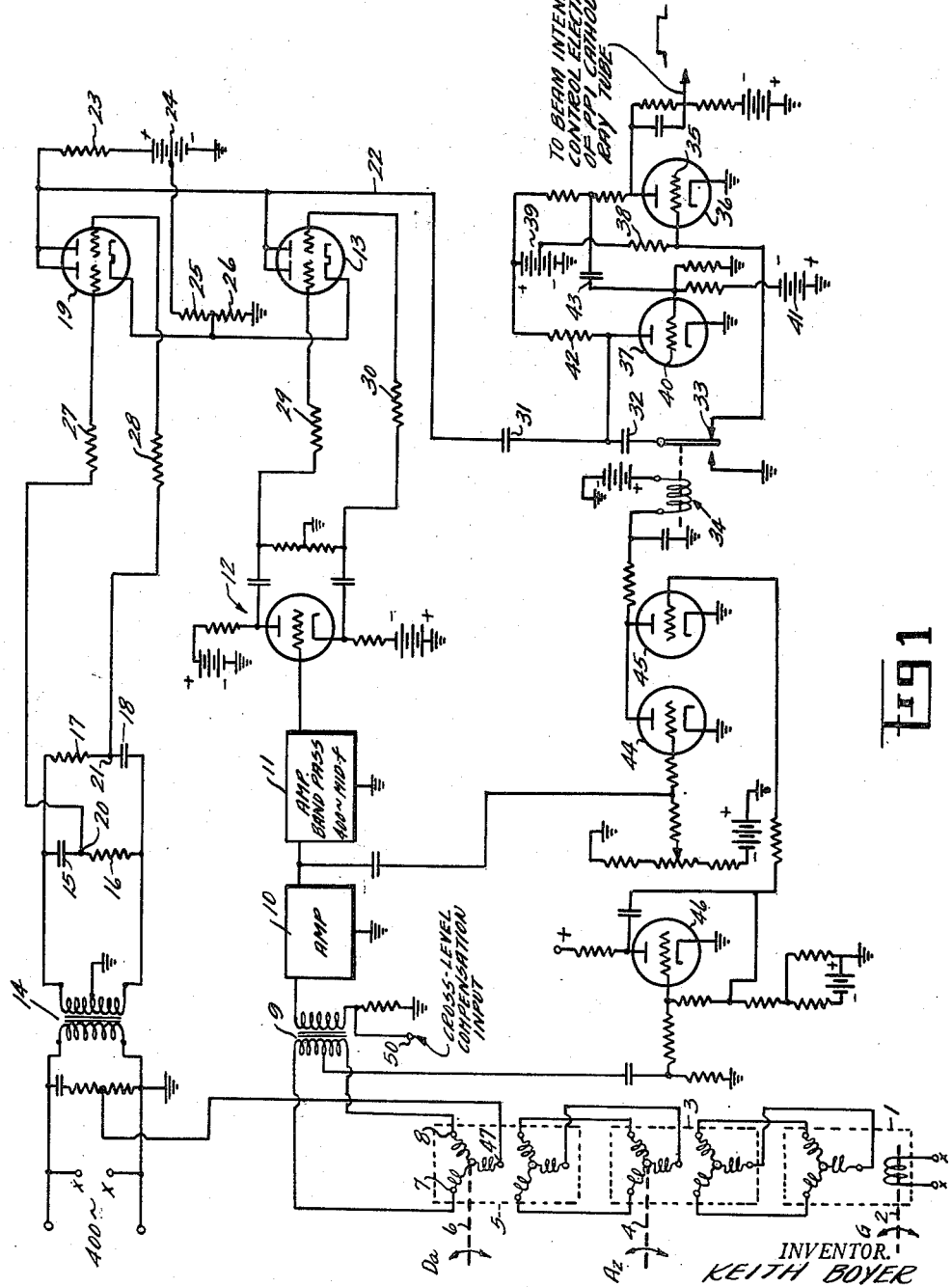

Referring to Fig. 1, synchro 1 has its rotor winding energized with 400 cps. alternating current at terminals $x$—$x$. The rotor winding is positioned angularly by shaft 2 in accordance with the heading angle G of the airplane as determined by the compass. The stator windings of synchro 1 are connected to the stator windings of differential synchro 3. The rotor of this synchro revolves with the spinner radar antenna on the airplane, to which it is connected by way of shaft 4, so that at any instant its angular position corresponds to the azimuth angle $A_z$ of the antenna relative to the airplane heading. Another differential synchro 5 is provided which has its rotor positioned by shaft 6 to correspond to the azimuth angle $D_a$ from the airplane to the fix or aim point. The determination of this direction and the positioning of shaft 6 in accordance therewith is accomplished by an airborne computer which does not form a part of this invention. The stator windings of synchro 5 are energized from the rotor windings of synchro 3.

With the above described arrangement a revolving flux is produced in synchro 5 the angular position of which at any instant is equal to $G+A_z$. This revolving flux produces a voltage across terminals 7—8 which passes through zero twice in each revolution of the flux. The rotor of synchro 5 is positioned on shaft 6 so that a null occurs when $G+A_z=D_a$. In other words a null occurs whenever the azimuths of the antenna and the fix or aim point, as measured from true north, are equal. The azimuth mark generator circuit responds to this null to produce an unblanking pulse for the cathode-ray tube beam. A null also occurs when the antenna azimuth is 180° from the azimuth to the fix or aim point. The circuit incorporates means, which will be described later, to prevent response to this undesired null.

The signal at terminals 7—8 is applied to the primary of transformer 9 and thence through amplifier 10 and band-pass amplifier 11 to the input of phase inverter stage 12. This stage splits the signal into two signals of equal amplitude and opposite phase which are applied to the control grids of dual triode 13. Also a 400 cps. voltage, from the same source as the voltage applied to the rotor of synchro 1, is applied to the primary of transformer 14 and thence through a 90° phase shifter consisting of elements 15, 16, 17 and 18 to the grids of dual triode tube 19. Since the voltage between points 20—21 is in quadrature with the secondary voltage of transformer 14 and since this secondary is center-tapped, the voltages on the grids of tube 19 are equal in amplitude and opposite in phase and, further, are in quadrature phase relation to the voltages on the grids of tube 13.

The purpose of tubes 13 and 19 and the above described circuits associated therewith is to produce four or five sharp output pulses on output conductor 22 each time the signal applied to transformer 9 passes through zero. How this is accomplished may be seen from a more detailed description of the circuit. Tubes 13 and 19 have their anodes connected together and through common load resistor 23 to voltage source 24. The cathodes of these tubes are likewise connected together and to a point on a potential divider composed of resistors 25 and 26, the voltage drop across resistor 26 acting as a negative bias for the grids of tubes 13 and 19. Resistors 27, 28, 29 and 30, connected in series with the grids of tubes 19 and 13, are of sufficiently high value to prevent these grids from being driven more than a very small amount positive relative to the cathodes. The signal applied to the grids of tube 19 from transformer 14 is sufficient to greatly overdrive these tubes. The same is true of the signal applied to the grids of tube 13 from inverter stage 12 except when the signal applied to transformer 9 passes through zero.

The voltage of source 24, the value of resistance 23 and the voltage drop across resistor 26 are so selected (1) that the triode sections of tubes 13 and 19 are biased well beyond the cut-off point and (2) that zero or a very slight positive voltage on the grid of any triode section reduces the potential of the associated anode, and consequently all the other anodes because of their connection thereto, to such a low value that above cut-off potentials on any of the other grids do not result in any appreciable further lowering of the potential of the anodes. Therefore, as long as a condition in which at least one of the grids of tubes 13 and 19 has a potential equal to or greater than zero exists, the output conductor 22 has a low substantially constant potential and no output signal is generated. With the overlap provided by the quadrature phase relation between the signals on the grids of tubes 13 and 19, and with sufficient amplification in stages 10 and 11, the signals on the grids of tube 13 may be kept high enough that the above condition exists at all times except during a short interval centered about the time that the signal applied to transformer 9 passes through zero.

Fig. 2 gives a graphical representation of the above process. In this figure a graph of anode voltage, representing the voltage on conductor 22 of Fig. 1, is superimposed on a graph of the grid voltages of tubes 13 and 19 and designated 13a, 13b, 19a and 19b. Since tubes 13 and 19 are biased beyond the cut-off point the negative half-cycles of grid voltage are not significant and therefore only the positive half-cycles are shown. The grid voltages 19a and 19b for tube 19 are of a constant amplitude much greater than that required to carry the grids to the zero voltage point. The grid voltages 13a and 13b are also much greater than required to carry the grids of tube 13 beyond the zero voltage point except during the interval when the signal applied to transformer 9 is passing through zero. The left-hand portion of Fig. 2 represents the conditions existing when the grid voltages on the grids of tubes 13 and 19 are greater than required to bring the grids to zero voltage. Due to the overlapping of grid voltages resulting from the quadrature phase relation between the signals applied to the two tubes there is always at least one grid at zero potential or slightly thereabove and the anode voltage, represented by the heavy line, has a substantially constant low minimum value.

The right-hand portion of Fig. 2 illustrates the operation of the circuit when the signal voltages on the grids of tube 13, namely 13a and 13b, fall below zero. For this condition, as will be seen in the drawing, there occur short intervals between half-cycles of voltages 19a and 19b in which all of the grids in tubes 13 and 19 have potentials below zero. During these intervals the anode potential rises producing the output pulses shown in Fig. 2. The period during which the voltages 13a and 13b are below zero and consequently the number of pulses produced for each null of the signal applied to transformer 9 is determined by the gain in amplifier stages 10 and 11.

The positive pulses appearing on conductor 22 at each null of the 400 cps. voltage applied to transformer 9 are applied through condensers 31 and 32 and contact 33 of relay 34 to grid 35 of tube 36. This tube and tube 37 with their associated circuit form a one-cycle multivibrator. Grid 35 is connected through resistor 38 to positive voltage source 39 whereas grid 40 of tube 37 is biased beyond cut-off by negative voltage obtained from source 41. The multivibrator has a stable condition in which tube 36 is conductive and tube 37 is cut off. In this condition the grid 35 is only very slightly positive relative to the cathode of tube 36. A positive pulse on conductor 22 causes condenser 32 to charge through a circuit including the grid-cathode path of tube 36. This results in a considerable increase in the charge on condenser 32. At the termination of the pulse condenser 32 discharges through resistors 38 and 42. The resulting drop across resistor 38 lowers the potential of grid 35 below that of the cathode and reduces the current in tube 36 causing the anode potential in this tube to rise. The rise in anode potential is transmitted through condenser 43 to grid 40 causing conduction in tube 37, and the resulting drop in the anode potential of tube 37 acts through condenser 32 to lower the potential of grid 35 still further. The above regenerative process takes place almost instantaneously and results ultimately in full conduction in tube 37 and zero conduction in tube 36. As a result of the now greatly lowered anode voltage of tube 37, condenser 32 discharges through resistors 42 and 38 and the exponentially decreasing current of this discharge allows grid 35 to rise in potential toward the cut-off point. When cut-off is reached tube 36 begins to conduct, initiating a switching action in the circuit that restores the first condition of stability in which tube 36 is fully conductive and tube 37 is cut off.

For each cycle of operation the multivibrator generates a square wave of voltage at the anode of tube 36 the duration of which is determined by the time constant of condenser 32 and its discharge circuit. The duration of the pulse should be sufficiently long to unblank the beam of the cathode-ray tube for at least two sweeps so as to insure the generation of a full length azimuth line on the screen. By the generation of several positive output pulses the multivibrator is triggered slightly before the exact null point of the envelope of the alternating voltage applied to transformer 9. This compensates for the slight delay encountered in the band-pass amplifier 11 and thereby keeps the unblanking pedestal in close synchronization with the $D_a$ synchro 5 null.

The above described circuit produces an unblanking pulse each time the envelope of the 400 cps. voltage applied to transformer 9 passes through zero. As already pointed out nulls occur when $G+A_z=D_a$ and when $G+A_z=D_a+180°$. The latter null is undesired and relay 34 is provided for preventing the generation of an unblanking pulse in response thereto. This relay is actuated by a combination of two voltages applied to the rectifier tubes 44 and 45. One voltage is obtained from the output of amplifier 10 and the other voltage is obtained from the midpoint of the primary of transformer 9.

The generation of the above two voltages is illustrated in Fig. 3. The envelope of the voltage from the midpoint of the primary of transformer 9 to ground is the sum of the voltage from the primary midpoint to terminal 47 of synchro 5 and the voltage from terminal 47 to ground. The voltage from the primary midpoint to terminal 47 is shown at $(d)$ in Fig. 3 while the voltage from terminal 47 to ground is shown at $(e)$. The sum of these two voltages, which is the voltage from the primary midpoint of transformer 9 to ground, is shown at $(f)$. This voltage, after amplification by tube 46, is applied to the grid of rectifier 45. The resulting rectified output is shown at $(g)$ in Fig. 3. The output voltage of amplifier 10, shown at $(i)$ in Fig. 3, is applied to the grid of rectifier 44. The resulting rectified output is shown at $(j)$. The time during which relay 34 is actuated by current $(g)$ is shown at $(h)$ and the time during which the relay is actuated by current $(j)$ is shown at $(k)$. The total time during which the relay is energized is shown at $(l)$ in Fig. 3. From this graph it is seen that relay 34 is energized during the occurrence of the unwanted null and while energized grounds conductor 22 (Fig. 1). This action prevents the application of the output pulses occurring on this conductor at the null to grid 35 of the multivibrator so that no unblanking pulse is generated.

When an airplane having a spinner antenna is not in level flight, an azimuth marker on the cathode-ray tube screen produced as above when the heading angle plus the antenna azimuth angle is equal to the angle to the fix or aim point, would no longer intersect the fix or aim point. When the heading of the aircraft is directly toward the fix or aim point, azimuth accuracy is affected only by roll. With the heading at 90° to the fix or aim point line, only pitch will displace the beam. With other headings, the discrepancy is a function of both pitch and roll and is called cross-level error.

The cross-level or roll error causes a displacement of the azimuth line on the screen which varies with the ground range, with the angle of cross-level error, and with the altitude of the airplane. In order to correct for this condition, a 400 cps. voltage, proportional in amplitude to these factors, is applied to terminal 50 in Fig. 1. Application of the cross-level voltage to the azimuth mark generator causes the unblanking pulse generated thereby to occur later or sooner than normally by a sufficient amount to compensate for the cross-level error. The cross-level voltage has two possible phases, 180° apart, which signify whether the generation of the pulse is to be retarded or advanced, and an amplitude proportional to the amount of displacement required. The apparatus for generating the above described cross-level voltage is not a part of this invention and therefore its details need not be described in this specification. The cross-level voltage must be initially obtained from or else synchronized with the 400 cps. voltage applied to transformer 14 in Fig. 1.

The operation of the azimuth mark generator in the presence of a cross-level voltage input is illustrated in Fig. 4. Graph $(a)$ in this figure represents the output of transformer 9 and graph $(b)$ represents the cross level voltage applied to terminal 50. The two voltages are added in series to produce the voltage shown at (c), the plus and minus signs representing the two opposite phases which the voltages may have. The voltage (c) is applied to the input of tube 13 and in the manner already explained a group of several output pulses appears on conductor 22 for each null of the envelope of this voltage. As will be noted in Fig. 4 the nulls are displaced in opposite directions from their normal positions by the cross-level voltage. For any particular null the direction of displacement is determined by the phase of the cross-level voltage and the amount of displacement by the amplitude. In this manner the times of occurrence of the output pulses, and of the unblanking pulses generated thereby, are controlled so as to produce accurate azimuth marks on the cathode-ray tube screen in the presence of roll and pitch displacements of the airplane. The operation of relay 34 in the presence of a cross-level signal is illustrated in graphs (f) through (j) of Fig. 4. The operation is similar to that in the absence of a cross-level signal and prevents the generation of an azimuth mark pulse at the undesired nulls of voltage (e).

I claim:

1. A circuit adapted to respond to an amplitude modulated alternating voltage to generate a square wave of voltage when the envelope of said modulated voltage passes through zero, said circuit comprising four vacuum tubes each having an anode, a cathode and a control grid; means connecting the anodes of said tubes together and to a common output circuit; input circuits connected between the grids and cathodes of said tubes, said input circuits containing means for biasing said tubes beyond the anode current cut-off point; means for applying said amplitude modulated voltage in opposite phase to the input circuits of two of said tubes, the maximum amplitude of said voltage being sufficient to greatly overdrive said tubes; a source of constant amplitude alternating voltage of the same frequency as said modulated voltage; means, operating simultaneously with said first mentioned applying means, for applying said constant amplitude voltage in opposite phase to the input circuits of the remaining two tubes, said voltage having sufficient amplitude to greatly overdrive said tubes; means for introducing a quadrature phase relationship between the voltages applied to the input circuits of the first mentioned pair of tubes and the voltages applied to the second mentioned pair of tubes; a one-cycle square wave generator having a trigger input circuit; and means coupling said common output circuit to the trigger input circuit of said square wave generator.

2. A circuit adapted to respond to an amplitude modulated alternating voltage, the envelope of which passes through periodic nulls at which phase reversal of said alternating voltage occurs, to generate a square wave of voltage coincident with alternate nulls; said circuit comprising four vacuum tubes each having an anode, a cathode and a control grid; means connecting the anodes of said tubes together and to a common output circuit; input circuits connected between the grids and cathodes of said tubes, said input circuits containing means for biasing said tubes beyond the anode current cut-off point; means for applying said amplitude modulated voltage in opposite phase to the input circuits of two of said tubes, the maximum amplitude of said voltage being sufficient to greatly overdrive said tubes; a source of constant amplitude alternating voltage of the same frequency as said modulated voltage; means for applying said constant amplitude voltage in opposite phase to the input circuits of the remaining two tubes, said voltage having sufficient amplitude to greatly overdrive said tubes; means for introducing a quadrature phase relationship between the voltages applied to the input circuits of the first mentioned pair of tubes and the voltages applied to the second mentioned pair of tubes; a one-cycle square wave generator having a trigger input circuit; a relay having a pair of normally closed contacts; means coupling said common output circuit to the trigger input circuit of said square wave generator through said contacts; and means for energizing said relay and opening said contacts at all times except during intervals slightly greater than the duration of said square wave of voltage and centered with respect to said alternate nulls.

3. Apparatus as claimed in claim 2 in which said last named means comprises means for generating a second amplitude modulated alternating voltage identical to said first mentioned amplitude modulated voltage but having an envelope displaced in phase by 180 degrees relative to the envelope of said first mentioned voltage; means for adding said second modulated voltage to said constant amplitude alternating voltage to produce a third amplitude modulated alternating voltage with an envelope which has twice the period of the envelope of said first and second modulated voltages and which passes through nulls coincident with the said alternate nulls of said first mentioned modulated voltage; and means for rectifying said first and third modulated alternating voltages and applying the resulting direct currents to the energizing circuit of said relay, whereby said relay remains energized and said contacts open except during short time intervals centered with respect to said alternate nulls.

4. In an airborne radar navigational system having a directional antenna revolving at constant speed, having means for determining the heading of the airplane, having means for determining the direction from the airplane to a fix, and having a cathode-ray tube indicator of the plan position type, an azimuth mark generator circuit for producing a radial line on the screen of said cathode-ray tube when the sum of the heading angle and the angle of the antenna relative to the airplane equals the azimuth of the direction to the fix; said circuit comprising a synchro generator having three stator windings and a single rotor winding adapted to be angularly positioned in accordance with the heading of the airplane, a first differential synchro having three stator windings and three rotor windings adapted to be angularly positioned in accordance with the azimuth of the antenna relative to the airplane, and a second differential synchro having three stator windings and three rotor windings adapted to be angularly positioned in accordance with the azimuth of the direction to said fix; a source of constant amplitude alternating current; means coupling the rotor winding of said synchro generator to said source of alternating current, means coupling the stator windings of said synchro generator to the stator windings of said first differential synchro, and means coupling the rotor windings of said first differential synchro to the stator windings of said second differential synchro; four vacuum tubes each having an anode, a cathode and a control grid; means connecting the anodes of said tubes together and to a common output circuit; input circuits connected between the grids and cathodes of said tubes, said input circuits containing means for biasing said tubes beyond the anode current cut-off point; means for applying the voltage between two rotor winding terminals of said second differential synchro in opposite phase to the input circuits of two of said tubes and with sufficient maximum amplitude to greatly overdrive said tubes; means for applying a constant amplitude alternating voltage, obtained from said source of alternating voltage, in opposite phase to the input circuits of the remaining two tubes and with sufficient amplitude to greatly overdrive said tubes; means for introducing a quadrature phase relationship between the voltages applied to the input circuits of the first mentioned pair of tubes and the voltages applied to the second mentioned pair of tubes; a one-cycle square wave generator having a trigger input circuit; means coupling said common output circuit to the trigger input circuit of said square wave generator; and means for applying the square waves produced by said square wave generator to the beam intensity control electrode of said cathode-ray tube.

5. In an airborne radar navigational system having a directional antenna revolving at constant speed, having means for determining the heading of the airplane, having means for determining the direction from the airplane to a fix, and having a cathode-ray tube indicator of the plan position type, an azimuth mark generator circuit for producing a radial line on the screen of said cathode-ray tube when the sum of the heading angle and the angle of the antenna relative to the airplane equals the azimuth of the direction to the fix; said circuit comprising a synchro generator having three stator windings and a single rotor winding adapted to be angularly positioned in accordance with the heading of the airplane, a first differential synchro having three stator windings and three rotor windings adapted to be angularly positioned in accordance with the azimuth of the antenna relative to the airplane, and a second differential synchro having three stator windings and three rotor windings adapted to be angularly positioned in accordance with the azimuth of the direction to said fix; a source of constant amplitude alternating current; means coupling the rotor winding of said synchro generator to said source of alternating current, means coupling the stator windings of said synchro generator to the stator windings of said first differential synchro, and means coupling the rotor windings of said first differential synchro to the stator windings of said second differential synchro; four vacuum tubes each having an anode, a cathode and a control grid; means connecting the anodes of said tubes together and to a common output circuit; input circuits connected between the grids and cathodes of said tubes, said input circuits containing means for biasing said tubes beyond the anode current cut-off point; a transformer having a center-tapped primary; means for applying the voltage between two rotor winding terminals of said second differential synchro to the primary of said transformer; means for applying the voltage induced in the secondary of said transformer in opposite phase to the input circuits of two of said tubes and with sufficient maximum amplitude to greatly overdrive said tubes; means for applying a constant amplitude alternating voltage, obtained from said source of alternating voltage, in opposite phase to the input circuits of the remaining two tubes and with sufficient amplitude to greatly overdrive said tubes; means for introducing a quadrature phase relationship between the voltages applied to the input circuits of the first mentioned pair of tubes and the voltages applied to the second mentioned pair of tubes; a one-cycle square wave generator having a trigger input circuit; a relay having a pair of normally closed contacts; means coupling said common output circuit through said contacts to the trigger input circuit of said square wave generator; means for adding a portion of the voltage across said source of alternating current to the voltage appearing between the center tap of said transformer and the remaining rotor winding terminal of said second differential synchro, means for rectifying the resulting voltage and means for applying the rectified voltage to the energizing circuit of said relay; means for rectifying the voltage across the secondary of said transformer and for applying the rectified voltage to the energizing circuit of said relay; and means for applying the square wave output of said square generator to the beam intensity control electrode of said cathode-ray tube.

6. Apparatus as claimed in claim 5 in which means are provided for introducing a cross level error compensating signal in series with the secondary of said transformer.

References Cited in the file of this patent
UNITED STATES PATENTS
2,567,203    Golay _____ Sept. 11, 1951